(12) United States Patent
Humburg

(10) Patent No.: US 10,065,475 B2
(45) Date of Patent: Sep. 4, 2018

(54) AIR DISCHARGE ASSEMBLY UNIT, ESPECIALLY FOR ROUTING AIR INTO THE INTERIOR SPACE OF A VEHICLE

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 1091 days.

(21) Appl. No.: 14/277,350

(22) Filed: May 14, 2014

(65) Prior Publication Data
US 2014/0342651 A1 Nov. 20, 2014

(30) Foreign Application Priority Data
May 15, 2013 (DE) .................. 10 2013 208 944

(51) Int. Cl.
*B60H 1/26* (2006.01)
*B60H 1/00* (2006.01)
*B60H 1/34* (2006.01)

(52) U.S. Cl.
CPC ....... *B60H 1/00457* (2013.01); *B60H 1/3407* (2013.01)

(58) Field of Classification Search
CPC .... B60H 1/00454; B60H 1/3407; B60H 1/34; F24F 13/08; F15C 1/04
USPC .................. 454/143, 155, 152, 248, 187
See application file for complete search history.

(56) References Cited

U.S. PATENT DOCUMENTS

| | | | | |
|---|---|---|---|---|
| 2,872,859 A * | 2/1959 | Kennedy | .................. | F24F 1/01 181/224 |
| 4,191,543 A * | 3/1980 | Peters | ....................... | A61L 9/00 422/122 |
| 2010/0304655 A1 | 12/2010 | Nagasaka et al. | | |
| 2012/0088444 A1 | 4/2012 | Wittorf | | |
| 2012/0171942 A1 | 7/2012 | Herzer | | |

FOREIGN PATENT DOCUMENTS

| | | | |
|---|---|---|---|
| CN | 102442176 A | 5/2012 | |
| DE | 44 28 742 A1 | 2/1996 | |
| DE | 100 36 776 A1 | 2/2002 | |
| DE | 102010056398 A1 | 6/2012 | |
| EP | 1502786 A1 * | 2/2005 | ........... B60H 1/0055 |
| WO | 02/09892 A2 | 2/2002 | |

OTHER PUBLICATIONS

Englus translation of an Abstract of document EP 1502786A1.*
Chinese Search Report of Feb. 1, 2016 in English.

* cited by examiner

Primary Examiner — Helena Kosanovic
(74) Attorney, Agent, or Firm — McGlew and Tuttle, P.C.

(57) ABSTRACT

An air discharge assembly unit, especially for routing air (L) into the interior space (70) of a vehicle, includes an air routing duct (28) for routing primary air (H) from a primary air inlet area (18) to an air outlet area (40). A flow cross-sectional area of the air routing duct (28) decreases, at least in some areas away from the primary air inlet area (18), in the direction of the air outlet area (40) up to a duct area (30) with minimal flow cross-sectional area. A secondary air inlet area (41) is provided for the inlet of secondary air (N) into the air routing duct (28), in the area of the duct area (30), with minimal flow cross-sectional area.

13 Claims, 3 Drawing Sheets

AIR DISCHARGE ASSEMBLY UNIT, ESPECIALLY FOR ROUTING AIR INTO THE INTERIOR SPACE OF A VEHICLE

CROSS REFERENCE TO RELATED APPLICATIONS

This application claims the benefit of priority under 35 U.S.C. § 119 of DE 10 2013 208 944.9 filed May 15, 2013, the entire contents of which are incorporated herein by reference.

FIELD OF THE INVENTION

The present invention pertains to an air discharge assembly unit, which can be used to route air into the interior space of a vehicle.

BACKGROUND OF THE INVENTION

In vehicles that are also used for transporting persons, especially ambulances or rescue vehicles, the air, which is heated, for example, in a fuel-operated air heater, is introduced, in general, into the interior space of the vehicle at discharge sites provided in the roof area. This means that the heated air flows downward from the top. Persons standing in the interior space of the vehicle, for example, paramedics or emergency physicians in ambulances or rescue vehicles, have their heads comparatively close to these discharge sites. Since the air heated in a vehicle heater may have a temperature in the range of 80° C. and higher especially in case of heating operation with a comparatively high heat output, there is a risk that at least an unpleasant feeling may develop if the distance is short between such a discharge site and a person located in the interior space of the vehicle, but it may possibly also compromise the physical performance capacity.

SUMMARY OF THE INVENTION

An object of the present invention is to provide an air discharge assembly unit, especially for routing air into the interior space of a vehicle, with which excessively intense thermal load can be avoided even in the area close to the discharge site.

This object is accomplished according to the present invention by an air discharge assembly unit, especially for routing air into the interior space of a vehicle, comprising an air routing duct for routing primary air from a primary air inlet area to an air outlet area, wherein a flow cross-sectional area of the air routing duct decreases, at least in some areas, away from the primary air inlet area in the direction of the air outlet area up to a duct area with minimal flow cross-sectional area, and a secondary air inlet area for the inlet of secondary air into the air routing duct in the area of the duct area with minimal flow cross-sectional area.

The air discharge assembly unit designed according to the present invention can be used such that primary air, heated, for example, by a fuel-operated vehicle heater, is delivered through the air routing duct in the direction of the air outlet area and is introduced there into an interior space of the vehicle, which is to be heated. A secondary air stream, which is combined with the primary air stream in the air routing duct, can be drawn off, for example, from the interior space to be fed with the primary air stream through the secondary air inlet area, so that an air stream is generated, which is composed of the primary air stream and the secondary air stream and it has, in general, a reduced temperature compared to the primary air stream because of the mixing with the secondary air stream which generally has a lower temperature than the primary air stream, even when the primary air stream is fed with a comparatively high temperature. This lowering of the temperature of the air stream being discharged from the air discharge assembly unit takes place without a reduction of the heat output of a heater being necessary, and it thus makes possible a comparatively rapid and efficient heating of the interior space of a vehicle without excessive thermal load even close to or at the discharge site(s). Since the air discharge assembly unit, according to the present invention, operates according to the principle of a Venturi nozzle, i.e., the secondary air stream is drawn due to the Venturi injection into a narrowed area of the duct area due to the reduced static pressure in this area, no assembly units that need to be operated, e.g., blowers or the like, are necessary to achieve the thorough mixing of the primary air stream with the secondary air stream.

To combine the primary air stream with the secondary air stream, i.e., to guarantee the inlet of the secondary air stream into the primary air stream, it is provided that the secondary air inlet area comprises at least one secondary air inlet opening, through which the secondary air is added to the primary air.

To guarantee efficient mixing of the secondary air with the primary air, it is provided that a primary secondary air inlet opening surrounds a longitudinal axis of the air routing duct in a ring-shaped pattern, and provisions may, furthermore, be made for the primary secondary air inlet opening to have a truncated cone-shaped opening cross-sectional geometry.

To make it possible to take the secondary air, for example, from the interior space to be supplied, but possibly also from the surrounding area, it is provided that the secondary air inlet area comprises at least one secondary secondary air inlet opening, wherein at least one secondary secondary air inlet opening is open toward a secondary air flow space leading to the at least one primary secondary air inlet opening.

Since the at least one primary secondary air inlet opening is positioned, in general, relative to a longitudinal axis of the duct, such that it radially directly adjoins the air routing duct or the primary air stream, it is proposed, furthermore, that at least one secondary secondary air inlet opening be arranged radially outside the at least one primary secondary air inlet opening relative to the longitudinal axis of the air routing duct. It should be noted here that positioning of the at least one secondary secondary air inlet opening radially outside the at least one primary secondary air inlet opening defines only a radial relative positioning, i.e., for example, the radial distance from the longitudinal axis of the duct in the area in which these inlet openings are provided. These different types of secondary air inlet openings may, of course, be arranged such that they overlap each other in the circumferential direction, but, in principle, also in different circumferential areas.

Feeding secondary air in the direction of the at least one primary secondary air inlet opening with the lowest flow resistance possible can be guaranteed by the secondary air flow space surrounding a longitudinal axis of the duct in an essentially ring-shaped pattern.

To make it possible to influence the ratio at which primary air is mixed with secondary air, it is proposed that a flow cross-sectional area of at least one and preferably all secondary secondary air inlet openings be variable. For example, the flow cross-sectional area of at least one secondary secondary air inlet opening may be variable between a minimal flow cross-sectional area, which may be at or in the range of zero, and a maximal flow cross-sectional area, which guarantees a maximal secondary air stream.

To route the primary air in the direction of the air outlet area, it is proposed that a first part of the assembly unit have a duct wall for the air routing duct, wherein the duct wall is formed such that it tapers at least in some areas away from the primary air inlet area. It should be noted here that the statement that the cannel wall is designed with a tapering means that, for example, the distance between said wall and a longitudinal axis of the duct decreases in the direction of flow, and this decrease may be linear or also non-linear, so that a corresponding reduction of the flow cross-sectional area enclosed by the duct wall is achieved.

Furthermore, the duct wall may provide the duct area with the minimal flow cross-sectional area, i.e., the duct area in the vicinity of which the secondary air enters the primary air, preferably in an end of said duct wall located at a distance from the primary air inlet area.

Furthermore, a second assembly unit part may be provided according to the present invention, and this second assembly unit part has an air outlet opening for the primary air routed through the air routing duct and possibly also for the secondary air being added to the primary air through the at least one primary secondary air inlet opening. This air outlet opening, which is located downstream of the at least one primary secondary air inlet opening in the direction of flow, may provide, for example, essentially the air outlet area.

To provide an enlargement of the flow cross section for the air stream in the direction away from the duct area with the minimal flow cross-sectional area and also from the area in which the secondary air is added to the primary air, it is proposed that the air outlet opening have a larger flow cross-sectional area than the duct area with the minimal flow cross-sectional area. Provisions may be made now, in particular, for at least one primary secondary air inlet opening between the duct wall of the first assembly unit part and the second assembly unit part to be limited in its area that provides the air outlet opening.

It is provided according to another, especially advantageous aspect that the first assembly unit part have at least one first secondary opening area, that the second assembly unit part have at least one second secondary opening area, and that the at least one first secondary opening area and the at least one second secondary opening area to be movable relative to one another preferably by rotating the second assembly unit part relative to the first assembly unit part for providing at least one secondary secondary air inlet opening with variable flow cross-sectional area. The first and second secondary opening areas may be formed, for example, in the circumferential direction between wall areas of the first assembly unit part and of the second assembly unit part, respectively, which said wall areas extend in the direction of a longitudinal axis of the duct, and which said wall areas can be positioned overlappingly in the circumferential direction and provide a variable flow cross-sectional area for at least one secondary secondary air inlet opening by rotating the two assembly unit parts relative to one another and by the change in the extent of the overlap, which change is generated thereby.

The present invention pertains, furthermore, to an air routing system for routing air into a space area, preferably into the interior space of a vehicle, comprising at least one air discharge assembly unit designed according to the present invention. A heater, for example, one operated with fuel, in which the air, which is taken up, for example, from the outside, is heated and then routed in the direction of the at least one air discharge assembly unit, can be associated with the air routing system, especially if the air to be introduced into the interior space of the vehicle is to be treated thermally, i.e., for example, heated.

Further, provisions may be made in the air routing system for the air outlet area as well as least one secondary secondary air inlet opening to be open towards the space area.

The present invention will be described in detail below with reference to the figures attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
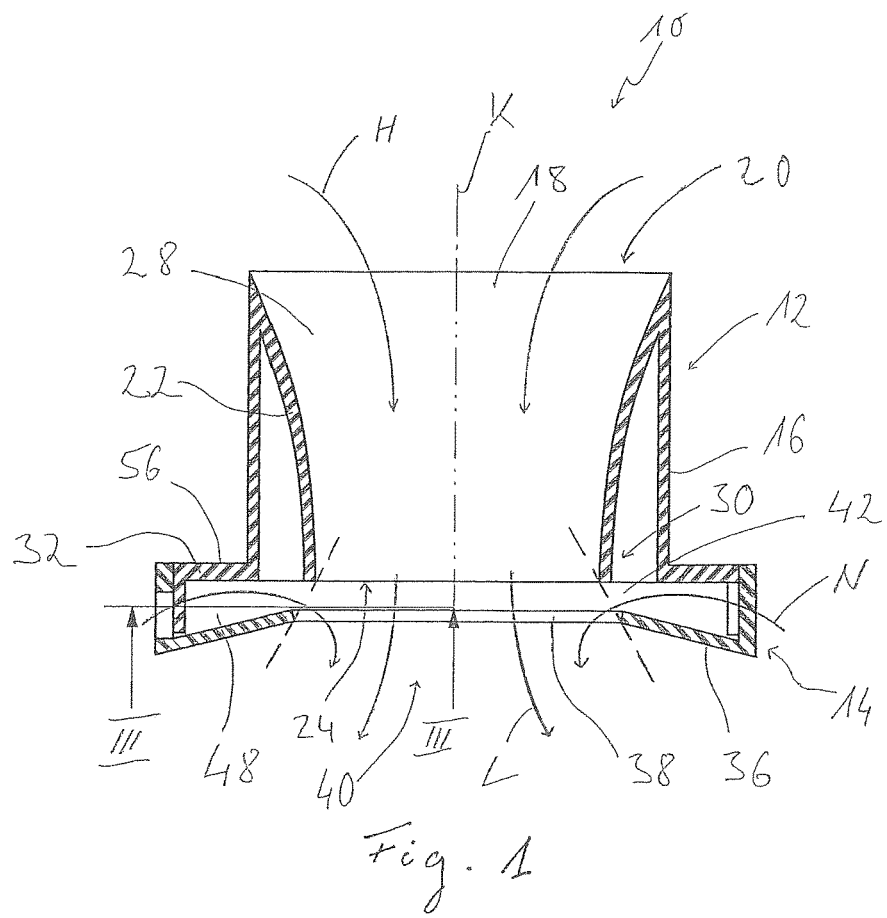
FIG. 1 is a longitudinal sectional view of an air discharge assembly unit.

Referring to the drawings in particular, an air discharge assembly unit is generally designated by 10 in FIG. 1. The air discharge assembly unit comprises a first assembly unit part 12 as well as a second assembly unit part 14 rotatable about a longitudinal axis K of the duct in relation to the first assembly unit part 12.

The first assembly unit part 12 is provided with a, for example, essentially cylindrical outer wall 16. The outer wall 16 is in connection with a duct wall 22 in an axial end area 20 providing a primary air inlet area 18. The duct wall 22 is designed such that it tapers in the direction of the longitudinal axis K of the duct starting from the primary air inlet area 18, which leads to a reduction of the flow cross-sectional area of an air routing duct 28 defined by the duct wall 22. A duct area 30 with a minimal flow cross-sectional area is formed in the end area 24 of the duct wall 22.

The outer wall 16 is joined by a flange-like, essentially radially extending expansion area 32 approximately in the axial area of the end area 24 of the duct wall 22. Starting from this expansion area 32, wall sections 34 providing essentially a ring-shaped wall configuration extend in the circumferential direction at circumferentially spaced locations from one another starting from said expansion area 32.

The second assembly unit part 14 provides a closing wall 36 set in a conical or truncated conical pattern in the upstream direction. An air outlet opening 38 is provided in the closing wall 36 in an area that is a central area or an area that is preferably coaxial or concentric to the longitudinal axis K of the duct, and this air outlet area 38 provides essentially an air outlet area 40 of the air discharge assembly unit 10. The air routing duct 28 enclosed by the two assembly unit parts 12, 14 ends at this air outlet area 40 or in the area of the air outlet area 38.

A secondary air inlet area 41 with a primary secondary air inlet, or mixing, opening 42 is formed between the axial end area 24 of the duct wall and the closing wall 36 of the second assembly unit part 14. This primary secondary air inlet opening preferably extends without interruption in a ring-shaped pattern around the longitudinal axis K of the duct and around the air routing duct 28 and thus it directly adjoins axially the duct wall 22. As is indicated by broken lines in FIG. 1, this primary secondary air inlet opening 42, extending in a ring-shaped pattern around the longitudinal axis K of the duct, has an essentially truncated cone-shaped opening cross-sectional geometry. This causes the flow cross section of the air routing duct 28 to have an increasing flow cross-sectional area starting from the duct area 30 with minimal flow cross-sectional area at the axial end area 24 of the duct wall 22 corresponding to the geometry, indicated by broken lines, of the primary secondary air inlet opening 42, towards the outlet opening 38. This also results especially from the fact that the outlet opening 38 has a larger flow cross-sectional area than the duct area 30 with minimal flow cross-sectional area if, for example, the geometry of the cross section is the same as that of the flow duct 28 in the axial end area 24 of the duct wall 22.

A circumferential wall 44 is provided at the second assembly unit part 14 such that the circumferential wall 44 radially adjoins the closing wall 36 of the second assembly unit part 14 on the outside. The circumferential wall 44 is advantageously essentially of a cylindrical shape and is dimensioned such that it extends radially around the wall sections 34 at the first assembly unit part 12 on the outside in the assembled state shown in FIG. 1. Together with the wall sections 34, the circumferential wall 44 forms secondary secondary air inlet openings 46 with variable flow cross-sectional area. Secondary air N can enter a secondary air flow space 48 surrounding the primary secondary air inlet opening 42 in a ring-shaped pattern through the secondary air inlet openings 46. The secondary air N reaches the primary secondary air inlet opening 42 through the secondary air flow space 48. The secondary air passing through the primary secondary air inlet opening 42 enters the air routing duct 28 surrounded by the two assembly unit parts 12, 14 and thus is added to the primary air H being routed therein as arriving from the primary air inlet area 18. These two air streams of the primary air H and secondary air N mix with one another and are discharged as the air stream L from the air discharge assembly unit 10.

Figure 3:
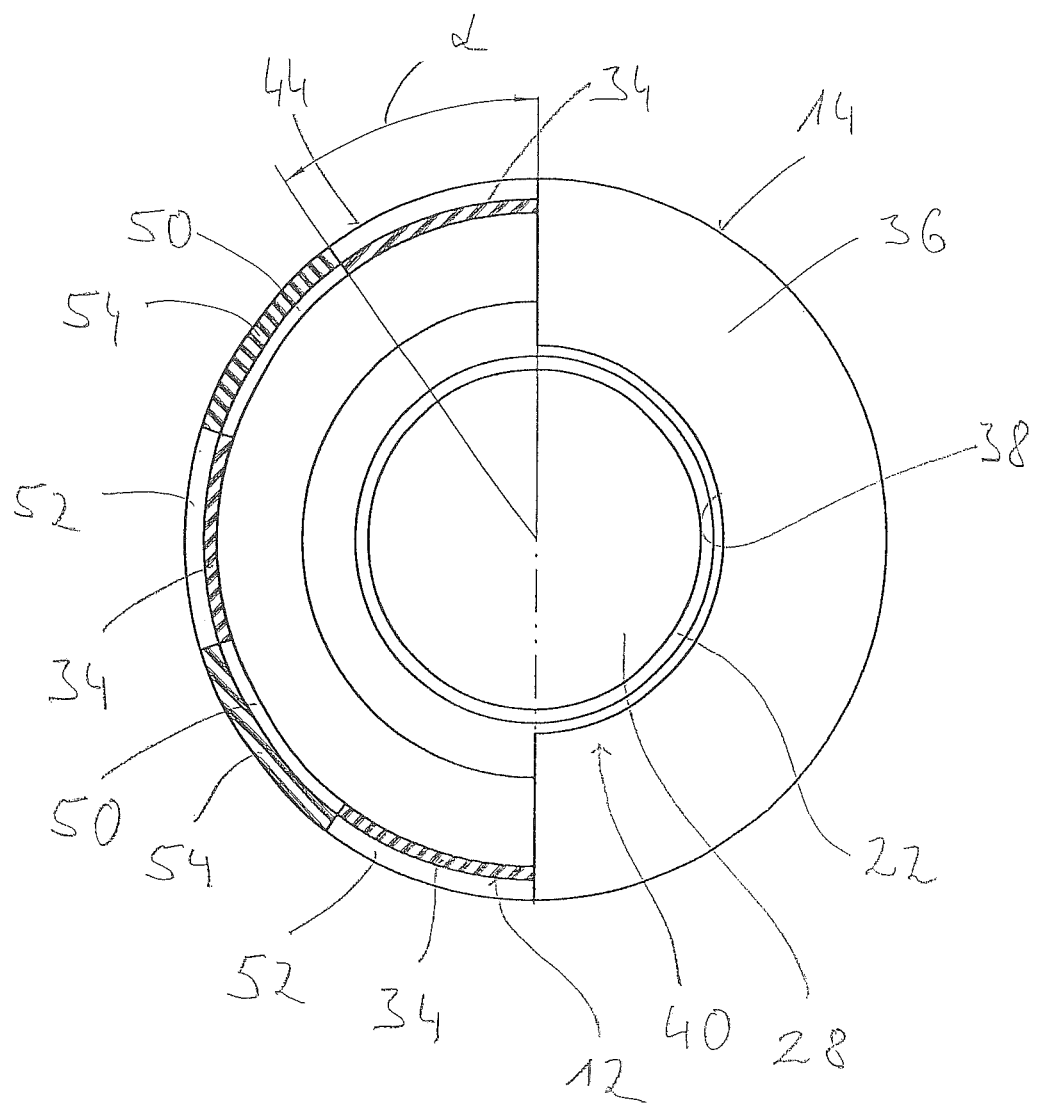
FIG. 3 is an axial view of the air discharge assembly unit according to FIG. 1, partly cut away along a line III-III in FIG. 1.

First secondary opening areas 50 that are open away from the flange-like expansion area 32 are formed in the direction of the longitudinal axis K of the duct in the circumferential direction between the wall sections 34 of the first assembly unit part. As this is illustrated in FIG. 3, the circumferential extension of these first secondary opening areas 50 may correspond to the circumferential extension of the wall sections 34. For example, the angle of the circumferential extension may be 36°.

Corresponding to the first secondary opening areas 50, second secondary opening areas 52 are provided in the circumferential wall 44 of the second assembly unit part 14. These may have the same circumferential extension as the first secondary opening areas 50, and a wall section 54 of the circumferential wall 44, which said wall section has a circumferential extension that may correspond to that of a respective wall section 34 at the first assembly unit part 12, is located in the circumferential direction between two secondary opening areas each.

The wall sections 34 and the circumferential wall 44 overlap each other in the direction of the longitudinal axis K of the duct in the assembled state shown in FIG. 1, so that the circumferential wall 44 advantageously ends flush with the rear side 56 of the flange-like expansion area 32, which said rear side is oriented in the direction of the primary air inlet area 18. The two assembly unit parts 12, 14 are rotatable in relation to one another about the longitudinal axis K of the duct and may be arranged, for example, in the relative rotational position shown in FIG. 3. The wall sections 34 and 54 are positioned in relation to one another in this relative rotational position such that they do not have essentially any circumferential overlap. This means that the first secondary opening areas 50 and the second secondary opening areas 52 essentially also fail to overlap each other in the circumferential direction and the flow path to the secondary air flow space 48 is thus blocked. The secondary air inlet openings 46 are thus blocked or have a flow cross-sectional area in the range of zero.

If the two assembly unit parts 12, 14 are rotated in relation to one another starting from the relative rotational positioning shown in FIG. 3, the first and second secondary opening areas 50, 52 will assume a position in which they overlap each other in the circumferential direction, so that the flow cross-sectional area of the secondary secondary air inlet openings 46 provided by a first secondary opening area 50 and a second secondary opening area 52 will correspondingly increase as well. The maximal flow cross-sectional area of the secondary secondary air inlet openings 46 is present if the first and second secondary opening areas 50, 52 and correspondingly the wall sections 34 and 54 fully overlap in the circumferential direction.

The quantity of the secondary air N to be added to the stream of the primary air H can thus be set by setting the relative positioning between the two assembly unit parts 12, 14 and correspondingly by setting the flow cross-sectional area of the secondary secondary air inlet openings 46. Since the secondary air N mixes with the primary air H in front of and in the area of the air outlet opening 38 and since, especially if the primary air H is heated air, this air may have a higher temperature than the secondary air N, a stream of air that will have a mixed temperature in the range between the temperature of the primary air and the temperature of the secondary air N will be discharged in the air outlet area 40.

It should be noted in this connection that the cross-sectional geometry or the variation of the cross-sectional area of the secondary secondary air inlet openings 46 can, of course, also be influenced by the magnitude of the circumferential extension of the first and second secondary opening areas 50, 52 and of the wall sections 34, 54. Embodiments that may deviate from the embodiment shown in FIG. 3 but have equal circumferential extension are, of course, possible. For example, first or/and second secondary opening areas 50, 52 with different circumferential extensions could be provided.

Furthermore, it should be noted that for a connection of the two assembly unit parts 12, 14 with one another, which permits a relative rotary motion but is nevertheless fixed, for example, one of the assembly unit parts may have, on an outer circumferential side, a radial projection, which can mesh with a corresponding depression on the inner circumference of the other component in a catch-like manner. The two assembly unit parts 12, 14 may be advantageously provided as plastic parts, in which case they may be designed with the structural aspects recognizable in the figures, i.e., with the different walls or wall sections, as integral components each.

Figure 4:
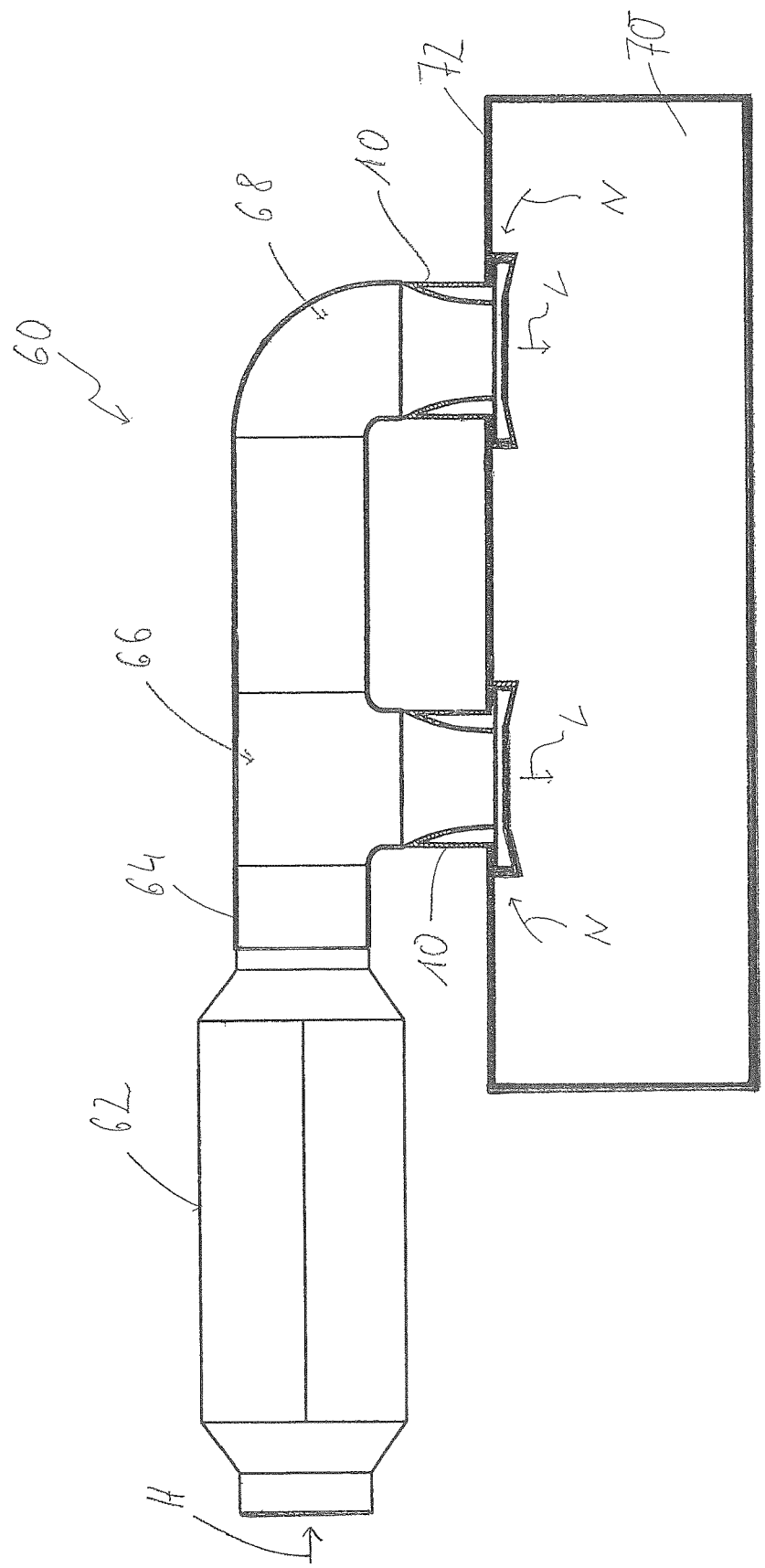
FIG. 4 is a schematic diagram of an air routing system with two air discharge assembly units according to FIG. 1.

FIG. 4 shows an air routing system 60, in which two air discharge assembly units 10 having the design explained above may be provided. For example, a fuel-operated vehicle heater 62, to which combustion air is fed through a combustion air feed arrangement and fuel through a fuel feed arrangement, is associated with the air routing system 60. The heat generated during the combustion operation can be transmitted to the primary air H, which is drawn in, for example, from the surrounding area. The primary air H heated in the heater 62 leaves said heater via a flow duct 64, which is open in a first branching area 66 towards the upstream air discharge assembly unit 10, and leads to the downstream air discharge assembly unit 10 in a second branching area or end area 68. Both air discharge assembly units 10 are positioned and oriented such that the respective air stream L leaving these flows into the interior space 70 of a vehicle. Further, both air discharge assembly units 10 are arranged such that the sides 56 of the flange-like expansion areas 32 are in contact with a wall 72 surrounding the interior space 70. Fixed mounting can be achieved, for example, by a fastening member surrounding the outer wall 16 on the rear side of said wall 72.

The secondary secondary air inlet openings 46 of the two air discharge assembly units 10 are open towards the interior space 70 of the vehicle in the arrangement shown in FIG. 4, so that the secondary air N to be mixed with the primary air H is drawn off from the interior space 70 of the vehicle. The amount of the secondary air N to be mixed with the primary air H can be set individually in each of the air discharge assembly units 10 by rotating the respective second assembly unit part 14 in the above-described manner. It thus becomes possible to set the temperature of the air L being routed into the interior space 70 of the vehicle by varying the percentage of the secondary air N to be added to the primary air H, without the need to change the heat output of the heater 62.

Since, furthermore, the air discharge assembly units 10 operate according to the principle of a Venturi nozzle and when the primary air is flowing, the secondary air is drawn in by the static vacuum present in the tapering air routing duct, no further feed means are necessary to achieve the addition of the secondary air. It should be noted out here that this effect can be achieved especially efficiently when the primary secondary air inlet opening is positioned as close as possible to the site where the air routing duct has its minimal flow cross-sectional area and the primary air flowing therein correspondingly has the highest flow velocity. However, the positioning of a secondary air inlet area in the area of the duct area with minimal flow cross-sectional area also comprises, in the sense of the present invention, deviations from this requirement, which deviations also guarantee that the secondary air can enter the air routing duct where a static vacuum is generated in the primary air stream based on an increased velocity of flow due to a reduced flow cross-sectional area.

To make it possible to influence the direction of discharge of the air L in the air outlet area 40, a routing surface arrangement provided with fins or the like may be arranged, for example, at the second assembly unit part 14, and a change in the direction of discharge can be achieved, for example, by pivoting fins providing such routing surfaces. This means that the outlet opening can be divided into a plurality of opening areas, either by pivotable fins or the like, or by a stationary grid arrangement or fin arrangement, optionally to influence the direction of discharge. It is advantageous in this case as well if the overall flow cross-sectional area of the opening sections of the air outlet opening 38, which opening sections are generated by such a division, is larger than the flow cross-sectional area in the duct area 30 with minimal flow cross-sectional area.

Figure 2:
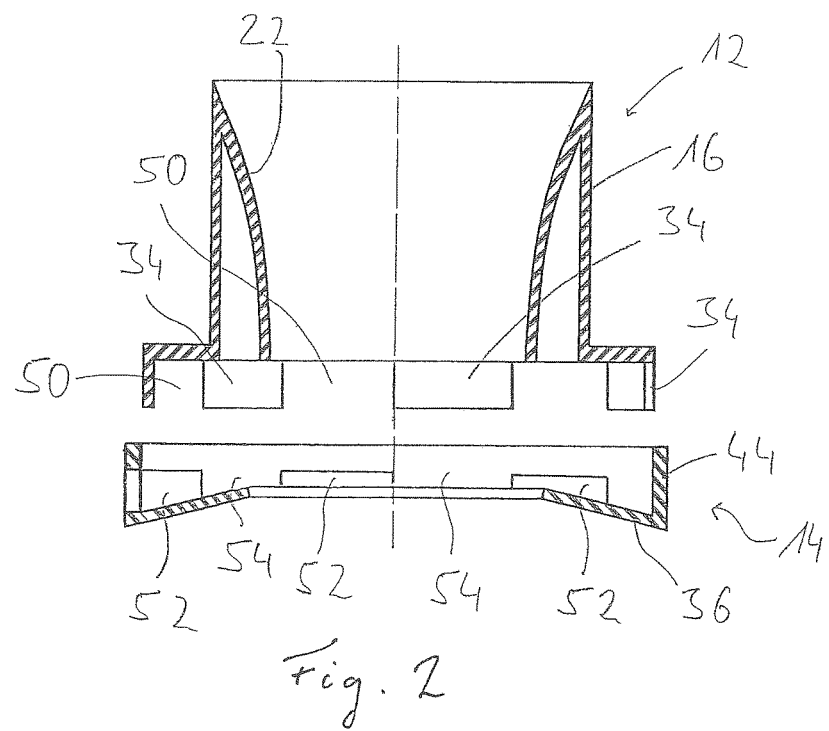
FIG. 2 is an exploded view of the air discharge assembly unit according to FIG. 1 with a first assembly unit part and with a second assembly unit part.

As is shown in FIGS. 1 and 2, the air routing duct may extend in the direction of a longitudinal axis K of the duct, which axis extends in a straight line, and may be provided with a flow cross-sectional area decreasing in this direction. The air routing duct 28 could, in principle, also have a curved design, in which case the longitudinal axis of the duct is curved correspondingly. References to a radial positioning in relation to the longitudinal axis of the duct should always be understood to mean such that the relative positioning is to be considered in the axial area of the air routing duct or of the longitudinal axis of the duct in which a formation having a certain positioning relative to the longitudinal axis of the duct is present.

While specific embodiments of the invention have been shown and described in detail to illustrate the application of the principles of the invention, it will be understood that the invention may be embodied otherwise without departing from such principles.

What is claimed is:

1. An air discharge assembly unit for routing air into an interior space of a vehicle, the air discharge assembly unit comprising:

an air routing duct defined by a duct wall of a first assembly unit part for routing primary air from a primary air inlet area to an air outlet area where the air routing duct ends, the air outlet area having an air outlet opening in a closing wall of a second assembly unit part, wherein the duct wall is tapering in the direction of a duct longitudinal axis, such that the air routing duct has a flow cross-sectional area that decreases, at least in some sections, in the direction of the air outlet area, away from the primary air inlet area, to a duct area with a minimal flow cross-sectional area provided in an axial end area of the duct wall; and a secondary air inlet area for the inlet of secondary air into the air routing duct in an area of the duct area with the minimal flow cross-sectional area, the secondary air inlet area comprising at least one primary secondary air inlet opening provided axially between the end area of the duct wall and the closing wall, wherein the secondary air is added to the primary air through the at least one primary secondary air inlet opening, the secondary air inlet area further comprising at least one secondary secondary air inlet opening, wherein the at least one secondary secondary air inlet opening is open towards a secondary air flow space leading to the at least one primary secondary air inlet opening, the secondary air entering the secondary air flow space through the at least one secondary secondary air inlet opening and exiting the secondary air flow space through the at least one primary secondary air inlet opening for being added to the primary air, a flow cross-sectional area of the at least one secondary secondary air inlet opening being variable, the second assembly unit part has the air outlet opening for the primary air being routed through the air routing duct and the at least one primary secondary air inlet opening for the secondary air added to the primary air; and the first assembly unit part has at least one first secondary opening area, the second assembly unit part has at least one second secondary opening area, and the at least one first secondary opening area and the at least one second secondary opening area are movable in relation to one another by rotating the second assembly unit part in relation to the first assembly unit part for providing the at least one secondary secondary air inlet opening with variable flow cross-sectional area.

2. An air discharge assembly unit in accordance with claim 1, wherein the primary secondary air inlet opening surrounds a longitudinal axis of the air routing duct in a ring-shaped pattern.

3. An air discharge assembly unit in accordance with claim 2, wherein the primary secondary air inlet opening has a truncated cone-shaped opening cross-sectional geometry.

4. An air discharge assembly unit in accordance with claim 1, wherein the at least one secondary secondary air inlet opening is arranged radially outside the at least one primary secondary air inlet opening relative to a longitudinal axis of the air routing duct.

5. An air discharge assembly unit in accordance with claim 4, wherein the secondary air flow space surrounds the longitudinal axis of the duct in an essentially ring-shaped pattern.

6. An air discharge assembly unit in accordance with claim 1, wherein the duct wall tapers, at least in some areas, away from the primary air inlet area.

7. An air discharge assembly unit in accordance with claim 6, wherein the duct wall provides the duct area with minimal flow cross-sectional area, in an end area of said duct wall, located at a distance from the primary air inlet area.

8. An air discharge assembly unit in accordance with claim 6, wherein a second assembly unit part has an air outlet opening for the primary air being routed through the air routing duct and the at least one primary secondary air inlet opening for the secondary air added to the primary air, wherein the air outlet opening essentially defines the air outlet area.

9. An air discharge assembly unit in accordance with claim 1, wherein the air outlet opening has a larger flow cross-sectional area than the duct area with the minimal flow cross-sectional area.

10. An air discharge assembly unit in accordance with claim 1, wherein:
the at least one primary secondary air inlet opening is defined in an area providing the air outlet opening between the duct wall of the first assembly unit part and the second assembly unit part.

11. An air routing system for routing air in an interior space area of a vehicle, the air routing system comprising:
at least one air discharge assembly unit comprising:
an air routing duct defined by a duct wall of a first assembly unit part for routing primary air from a primary air inlet area to an air outlet area where the air routing duct ends, the air outlet area having an air outlet opening in a closing wall of a second assembly unit part, wherein the duct wall is tapering in the direction of a duct longitudinal axis, such that the air routing duct has a flow cross-sectional area that decreases, at least in some sections, in the direction of the air outlet area, away from the primary air inlet area, to a duct area with a minimal flow cross-sectional area provided in an axial end area of the duct wall; and a secondary air inlet area for the inlet of secondary air into the air routing duct in an area of the duct area with the minimal flow cross-sectional area, the secondary air inlet area comprising at least one primary secondary air inlet opening provided axially between the end area of the duct wall and the closing wall, wherein the secondary air is added to the primary air through the at least one primary secondary air inlet opening, the secondary air inlet area further comprising at least one secondary secondary air inlet opening, wherein the at least one secondary secondary air inlet opening is open towards a secondary air flow space leading to the at least one primary secondary air inlet opening;

the second assembly unit part having an air outlet opening for the primary air being routed through the air routing duct and the at least one primary secondary air inlet opening for the secondary air added to the primary air;

the at least one secondary secondary air inlet opening is arranged radially outside the at least one primary secondary air inlet opening relative to a longitudinal axis of the air routing duct and the first assembly unit part has at least one first secondary opening area, the second assembly unit part has at least one second secondary opening area, and the at least one first secondary opening area and the at least one second secondary opening area are movable in relation to one another by rotating the second assembly unit part in relation to the first assembly unit part for providing the at least one secondary secondary air inlet opening with variable flow cross-sectional area.

12. An air routing system in accordance with claim 11, wherein the air outlet area as well as at least one secondary secondary air inlet area open towards the space area.

13. An air routing system in accordance claim 11, wherein:
the at least one primary secondary air inlet opening is defined in an area providing the air outlet opening between the duct wall of the first assembly unit part and the second assembly unit part.

* * * * *